United States Patent [19]

Rosencher et al.

[11] Patent Number: 5,739,949
[45] Date of Patent: Apr. 14, 1998

[54] FREQUENCY CONVERTER COMPRISING A HETEROSTRUCTURE SEMICONDUCTOR WAVEGUIDE

[75] Inventors: Emmanuel Rosencher, Bagneux; Vincent Berger, Paris, both of France

[73] Assignee: Thomson-CSF, Paris, France

[21] Appl. No.: 671,694

[22] Filed: Jun. 28, 1996

[30] Foreign Application Priority Data

Jun. 30, 1995 [FR] France .................. 95 07918

[51] Int. Cl.⁶ .................................................. G02F 1/35
[52] U.S. Cl. ......................... 359/332; 359/330; 385/122
[58] Field of Search ............................ 385/122; 372/21, 372/22; 359/326–332

[56] References Cited

U.S. PATENT DOCUMENTS

| | | | |
|---|---|---|---|
| 3,982,135 | 9/1976 | Van Der Ziel | 359/328 |
| 4,866,489 | 9/1989 | Yokogawa et al. | 359/326 |
| 5,059,001 | 10/1991 | Shimizu | 359/326 X |
| 5,086,327 | 2/1992 | Rosencher et al. | 257/21 |
| 5,228,777 | 7/1993 | Rosencher et al. | 374/32 |
| 5,311,278 | 5/1994 | Rosencher | 356/326 |
| 5,326,984 | 7/1994 | Rosencher et al. | 257/21 |
| 5,406,575 | 4/1995 | Chelny et al. | 359/328 X |
| 5,506,418 | 4/1996 | Bois et al. | 257/15 |

FOREIGN PATENT DOCUMENTS

| | | |
|---|---|---|
| 0 324 505 | 7/1989 | European Pat. Off. |
| 1 254 617 | 11/1971 | United Kingdom |
| 2 187 569 | 9/1987 | United Kingdom |

OTHER PUBLICATIONS

S. Janz, et al., "Sum and Difference Frequency Mixing in Semiconductor Heterostructures", pp. 328–329, Opto–Electronics Inc., Unit 9,2538 Speers Rd., Oakville, Ontario, Canada, paper No. 10.1, (No Date).

H.C. Chui, et al., "Tunable Mid–Infrared Generation by Difference Frequency Mixing of Diode Laser Wavelengths in Intersubband INGAAS/AIAS Quantum Wells", Applied Physics Letters, 16 Jan. 1995, No. 3, Woodbury, NY, US, pp. 265–267.

J.P. Van Der Ziel, "Phase–Matched Harmonic Generation in a Laminar Structure with Wave Propagation in the Plane of the Layers", Applied Physics Letters, vol. 26, No. 2, 15 Jan. 1975, pp. 60–61.

Applied Physics Letters, vol. 68, No. 10, pp. 1320–1322, Mar. 4, 1996, A. Fiore, et al., "Huge Birefringence in Selectively Oxidized GaAs/AlAs Optical Waveguides".

*Primary Examiner*—John D. Lee
*Attorney, Agent, or Firm*—Oblon, Spivak, McClelland, Maier & Neustadt, P.C.

[57] ABSTRACT

A frequency converter can be used, in particular, to generate optical waves in the medium infrared (3.12 μm) range from optical sources in the near infrared range. It comprises a heterostructure semiconductor waveguide formed by an alternation of layers of material $M_I$ and $M_{II}$, at least one of these materials being a non-linear semiconductor and the plane of the layers being parallel to the direction of propagation of the electromagnetic waves in the waveguide.

9 Claims, 8 Drawing Sheets

FREQUENCY CONVERTER COMPRISING A HETEROSTRUCTURE SEMICONDUCTOR WAVEGUIDE

BACKGROUND OF THE INVENTION

1. Field of the Invention

The field of the invention is that of optical sources using frequency converters, making it possible in particular to generate optical waves in the mean infrared (3–12 μm) range using optical sources in the near infrared range.

2. Description of the Prior Art

At present, mean infrared wave emitters typically belong to the following three classes:

- laser diodes based on small-gap semiconductor materials such as PbSnSe or HgCdTe. These laser diodes work at low temperature, the wavelength tuning being done especially by variation of the operating temperature. These are low-power devices necessitating cryostats and are impractical to use;
- optical parametrical oscillators (OPO) that generate optical emission by non-linear interaction in massive materials (using frequency conversion operations). This technique has two drawbacks. The first one is that they assume the existence of birefringent crystals. The second drawback is that, since the conversion efficiency levels are modest in a massive medium (such as lithium niobate $LiNbO_3$), powerful and bulky pump lasers become necessary.

In this context, the present invention relates to another type of frequency converter whose original characteristics can be used to envisage better performance levels than those obtained with present devices.

The frequency converter according to the invention uses the so-called technique of "down-conversion" in a semiconductor Waveguide. This technique is well described in Ammon YARIV, *Quantum Electronics*, John Wiley and Sons, New York, 1989. It consists in mixing two waves in the near infrared at frequencies of $\omega_1$ and $\chi_2$ in a non-linear medium to generate a wave in the mean infrared at the frequency $\omega_3$ according to the following relationship: $\omega_3 = \omega_1 - \omega_2$ (1).

Thus, to generate an emission with a wavelength of 8 μm to 12 μm, it is enough to mix a pump wave at 0.9 μm and a tunable pump wave with a wavelength of 0.95 μm to 1 μm. Pump waves of this kind are presently available with semiconductor lasers.

The advantage of using near infrared sources is great for there are many tunable sources in the near infrared range that are highly powerful and compact (semiconductor diodes for example).

To carry out this down-conversion technique, the frequency converter uses a semiconductor waveguide structure, which represents the major feature of the invention.

Indeed, semiconductors such as GaAs or ZnSe have second-order non-linear coefficients (necessary for this down-conversion) that are extremely high. These coefficients are in the range of 100 pm/V or five times greater than is the case with metal oxide crystals such as KTP. Furthermore, the technology of these semiconductors is highly developed. This results in manufacturing techniques that are far less costly than is the case with metal oxide crystals.

It is thus possible to make guiding structures out of semiconductors and manufacture frequency converters that work in guided optics.

SUMMARY OF THE INVENTION

More specifically, an object of the invention is an electromagnetic wave frequency converter capable of generating an electromagnetic wave with a frequency $\omega_3$ out of an electromagnetic wave with a frequency $\omega_1$ wherein this converter comprises a heterostructure semiconductor waveguide formed by an alternation of layers of material $M_I$ and $M_{II}$, at least one of these materials being a non-linear semiconductor, the plane of the layers being parallel to the direction of propagation of the electromagnetic waves in the waveguide.

An object of the invention is also a frequency converter supplied by a single pump wave with a frequency $\omega_1$ and comprising two mirrors located at the ends of the waveguide, said mirrors being capable of strongly reflecting the wave with a frequency $\omega_1$ and of transmitting waves with frequencies of $\omega_2$ and $\omega_3$ generated in the converter.

Preferably, the condition of phase matching among the electromagnetic waves with frequencies $\omega_1$, $\omega_2$ and $\omega_3$ is achieved for propagation modes (TE) and (TM) that are different between the pump waves and/or the generated waves. For this purpose, the shape birefringence of the semiconductor heterostructures forming the waveguide will be used in the manner that shall be developed further below.

The frequency converter according to the invention may advantageously comprise a dual core structure in which the central waveguide, inserted in a semiconductor medium $SC_3$, guides the waves in the near infrared, the medium $SC_3$ being itself inserted into a semiconductor medium $SC_4$ to guide the waves in the mean infrared.

To improve the performance characteristics of the frequency converter according to the invention, it may be highly advantageous to use quantum structures prepared by means of very small thicknesses of layers of materials $M_I$ and $M_{II}$.

BRIEF DESCRIPTION OF THE DRAWINGS

The invention will be understood more clearly and other advantages shall appear from the following description given by way of a non-restrictive example and from the appended figures, of which:

FIG. 3 illustrates the variations of the refraction index as a function of the wavelength;

FIG. 7 illustrates the possible transitions in a quantum well structure for the TE (-) and TM ( . . . ) modes;

MORE DETAILED DESCRIPTION

Figure 1:
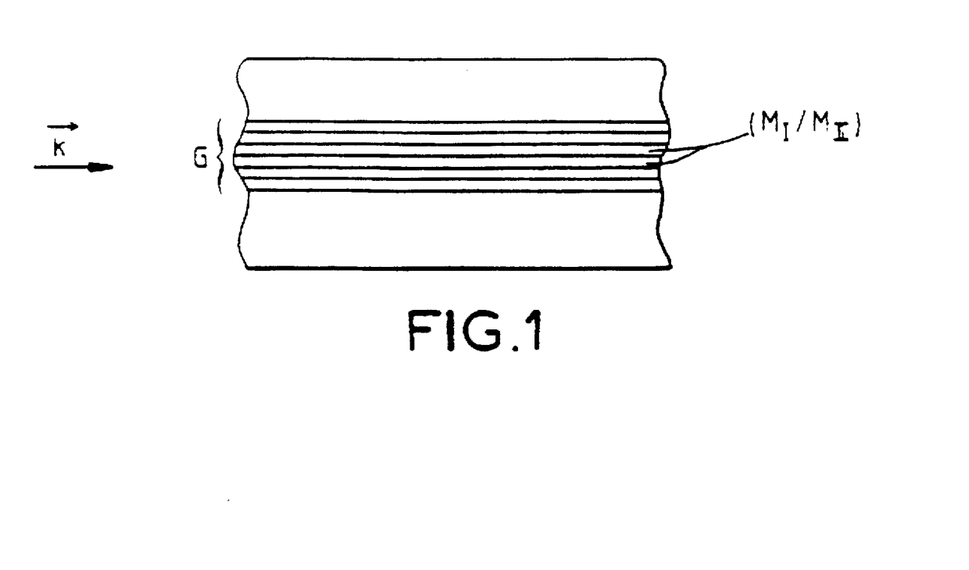
FIG. 1 gives a schematic view of a frequency converter according to the invention.

The frequency converter has a waveguide (G) formed by a stack of layers of material $M_I$ and material $M_{II}$ as shown in FIG. 1. This plane of the layers is parallel to the direction of propagation $\bar{k}$ of the pump waves and of the created waves.

The constituent materials of the stack of layers may advantageously be semiconductor materials $SC_1/SC_2$ such as GaAs/AlAs, Si/SiGe or else again ZnTe/ZnSe.

It may also be an alternation of a semiconductor and an insulator $SC_1/I$.

The waveguide is inserted into a semiconductor medium with a lower index.

The proposed architecture is particularly useful inasmuch as it enables the phase matching condition between the pump waves and the generated waves to be met efficiently.

Indeed, generally in frequency conversion operations, the wave generated by the difference in frequencies of two pump waves at $\omega_1$ and $\omega_2$ interferes destructively with these pump waves over a distance known as a "coherence length" $L_c$ given by the following formula;

$$1/L_c = n(\lambda_1)/\lambda_1 - n(\lambda_2)/\lambda_2 - n(\lambda_3)/\lambda_3 \quad (2)$$

In this formula, $n(\lambda_i)$ is the optical index of the material corresponding to the wavelength $\lambda_i$. The power generated gets cancelled out periodically in the material on nodes with vibrations separated by this coherence length. The aim of the phase matching is to make $L_c$ infinite. Nevertheless, because of the natural variations in the materials, the index $n(\lambda)$ is a strictly descending function of the wavelength $\lambda$ which makes the equation (2) impossible to meet. Up till now, a standard technique for overcoming this problem has consisted in using an ordinary direction and an extraordinary direction of the pump waves and generated waves, thus meeting an equation of the following type:

$$n_e(\lambda_1)/\lambda_1 - n_o(\lambda_2)/\lambda_2 - n_e(\lambda_3)/\lambda_3 = 0 \quad (3)$$

where $n_e$ and $n_o$ are the ordinary and extraordinary optical indices. Nevertheless, a technique of this kind cannot be used for the usual semiconductors such as GaAs or ZnSe which are not birefringent.

Preferably, the phase matching condition is met in the frequency converter according to the invention by using the shape birefringence.

Indeed it is known that optical waves moving in a stratified medium have phase velocities that differ depending on whether their polarization is perpendicular (TM mode) or parallel (TE mode) to the plane of the layers: this effect is called "shape birefringence". As shown by Van Der Ziel in *Applied Physics Letters*, 15 Jan. 1975 (page 60), for an infinite medium consisting of a stack of layers of two materials with difference indices $n_1$ and $n_2$ and having the same thicknesses, the indices of the TE and TM waves are respectively:

$$\epsilon_{TE} = (\epsilon_1 + \epsilon_2)/2 \text{ and } 1/\epsilon_{TM} = 1/\epsilon_1 + 1/\epsilon_2 \quad (4)$$

Figure 2:
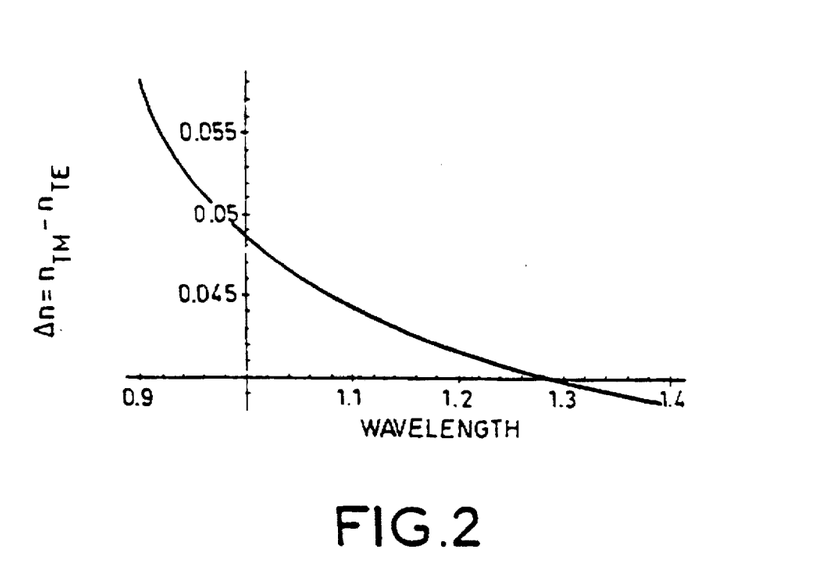
FIG. 2 illustrates the shape birefringence computed in a plate-like medium consisting of GaAs and AlAs layers of equal thicknesses.
Figure 3A:
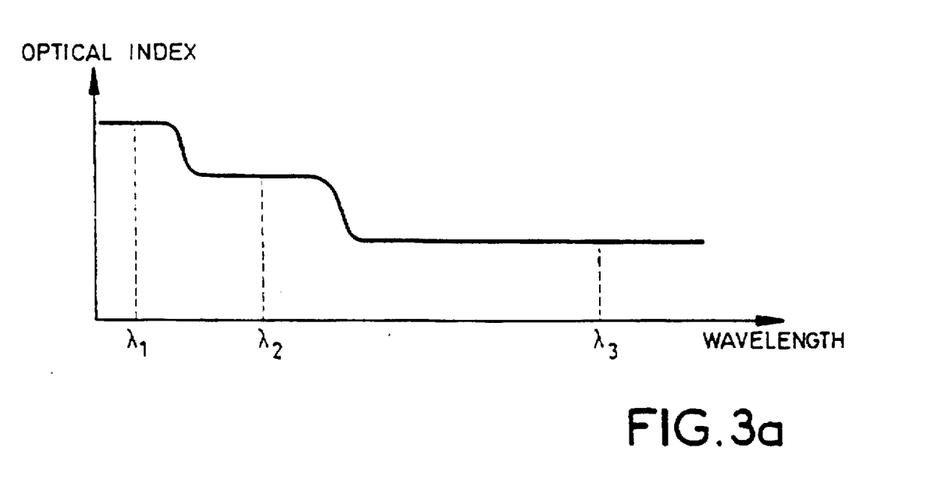
FIG. 3a represents the conventional range of variations.
Figure 3B:
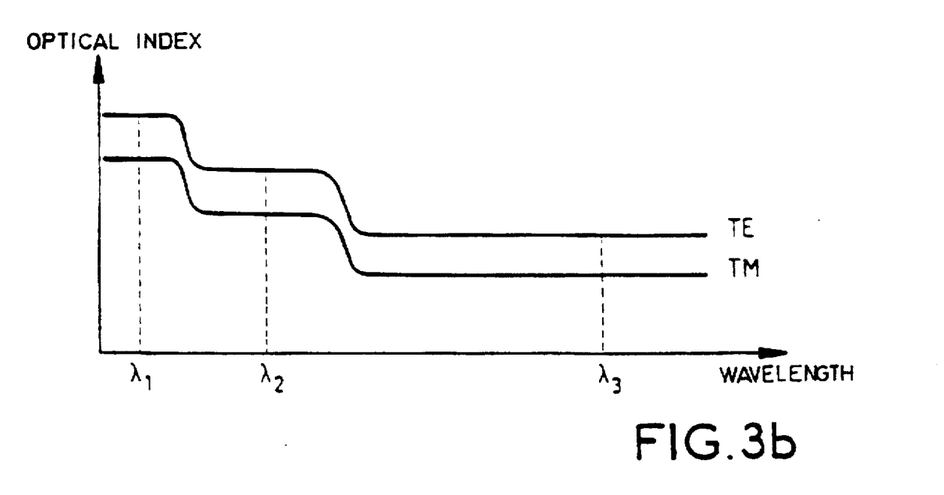
FIG. 3b illustrates the shape birefringence computed in a plate-like medium such as that used in the invention.

For example, FIG. 2 shows the birefringence $\Delta n = n_{TE} - n_{TM}$ in a GaAs/AlAs heterostructure. For a more complex guiding structure, the effective optical indices TE and TM are far more difficult to compute. Nevertheless, the conclusion is the same: the optical indices TE and TM a-re different, as shown in FIG. 3b, FIG. 3a representing the natural variation of the index of a material as a function of the wavelength.

In order to meet the phase matching condition (2), it is necessary to reduce the index of the pump at $\lambda_1$ in relation to the pump at $\lambda_2$. We will thus have:

$$n_{TM}(\lambda_1)/\lambda_1 - n_{TE}(\lambda_2)/\lambda_2 - n_{TE}(\lambda_3)/\lambda_3 = 0 \quad (5)$$

For example, an equation (4) of this kind can be met by using a medium of GaAs/AlAs layers of equal thicknesses, typically 100 Å, for tunable pump wavelengths of 1.02 to 1.42 µm and generated wavelengths of 8 to 12 µm.

Figure 4:
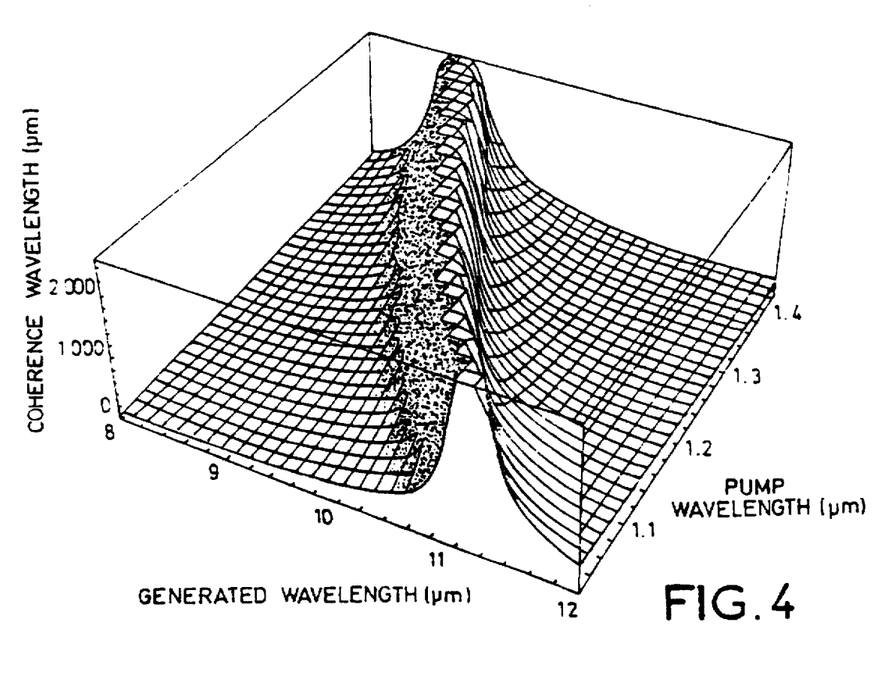
FIG. 4 illustrates the changes undergone by the coherence length $L_c$ as a function of the wavelength generated in a GaAs/AlAs plate-like medium for different pump wavelengths.
Figure 5:
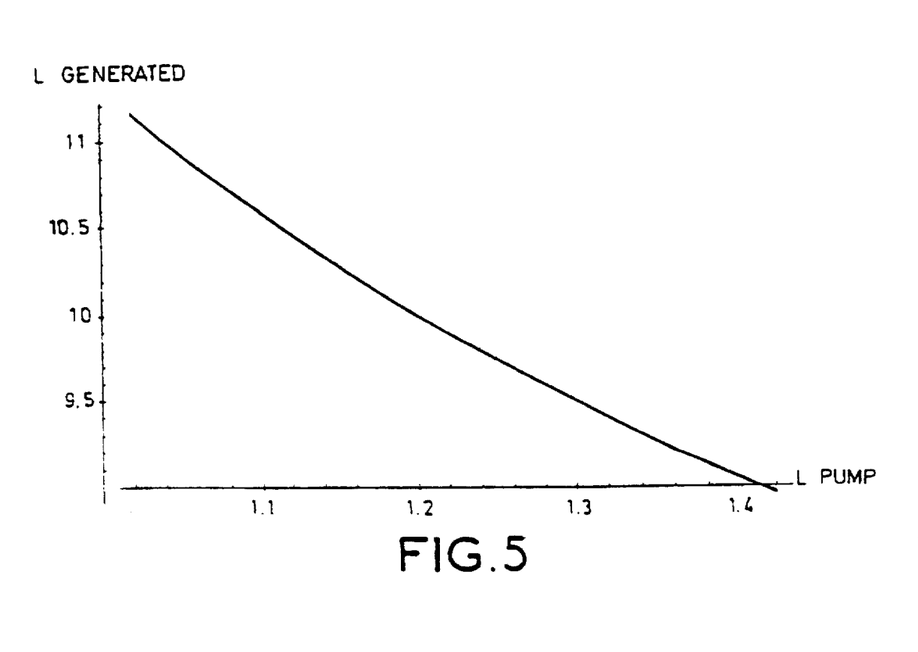
FIG. 5 illustrates the changes undergone by the wavelength generated as a function of one of the pump wavelengths for which there is a phase matching.

On this basis, FIG. 4 shows that the coherence wavelength diverges for certain pairs $\lambda_1$ and $\lambda_3$. This shows that the phase matching is possible. Furthermore, the conditions of resonance are not restricted: coherence lengths of more than 1 cm can be obtained on a range of 0.2 µm. FIG. 5 shows a curve of conversion obtained, namely the wavelengths generated as a function of the pump wavelengths $\lambda_3$ ($\lambda_1$). This validates the fact that the 8–12 µm range of wavelengths can effectively be covered by this technique.

It may be noted that if the generation of frequency difference is to be made possible, the non-linear coefficients corresponding to the directions brought into play should be not zero. Thus, for GaAs, since only the terms $\chi_{xyz}$ are not zero, precautions must be taken on the polarizations of the pump fields.

In one possible configuration, the TE polarization of a pump field is oriented at 45° to the main axes of the semiconductor crystal used, the other pump field being in TM mode.

Figure 6:
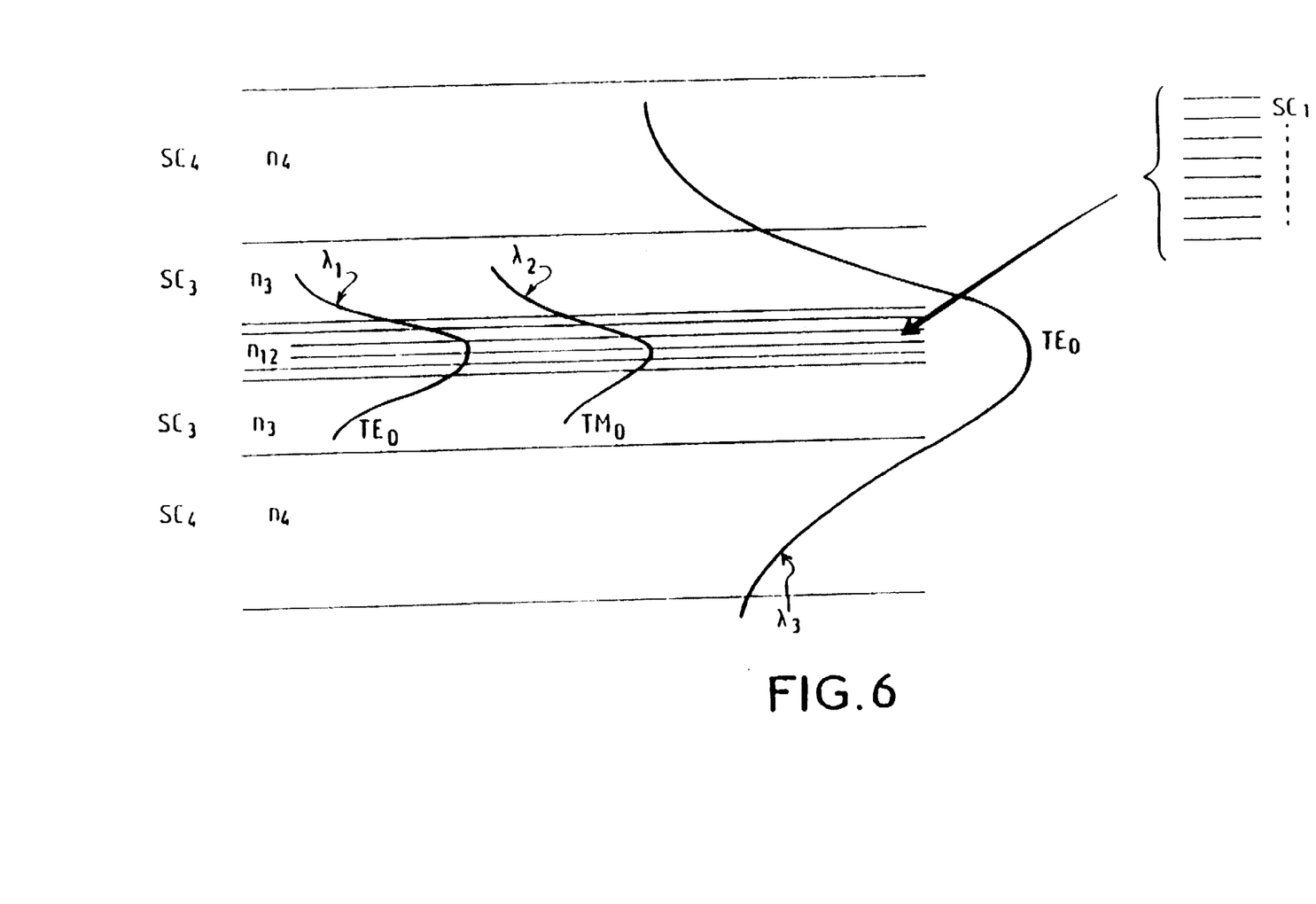
FIG. 6 illustrates a frequency converter configuration using a dual core structure.

To optimize the performance characteristics of the frequency converter according to the invention, at the level of the power generated by the non-linear waveguide, it is important to confine this non-linear waveguide to the maximum extent. This is why, in a preferred embodiment, the frequency converter has a dual core structure as shown in FIG. 6. A first waveguide is made from the stack of the layers of material $M_1$ and $M_{II}$, the index of this waveguide being represented by $n_{12}$, this waveguide being inserted into a semiconductor material $SC_3$ with an index $n_3$ itself inserted into another semiconductor material $SC_4$ with an index $n_4$. The thicknesses of the two waveguides are designed so that only modes with low indices TEo ($\lambda_1$) and TMo ($\lambda_2$) are present at all wavelengths and so that the mode overlapping integrals are high in the semiconductor waveguide. FIG. 6 shows an example of modes obtained in a structure where the materials $SC_1$ and $SC_2$ are respectively GaAs and AlAs, the materials $SC_3$ and $SC_4$ being AlGaAs and AlAs.

In another example of a frequency converter according to the invention, the heterostructure waveguide is formed by layers of very small thicknesses leading to the formation of quantum wells and to the discretization of the energy levels. For it is known that in the semiconductor-based quantum well structures, the wave functions of light holes and heavy holes have different symmetries with respect to each other.

Figure 7A:
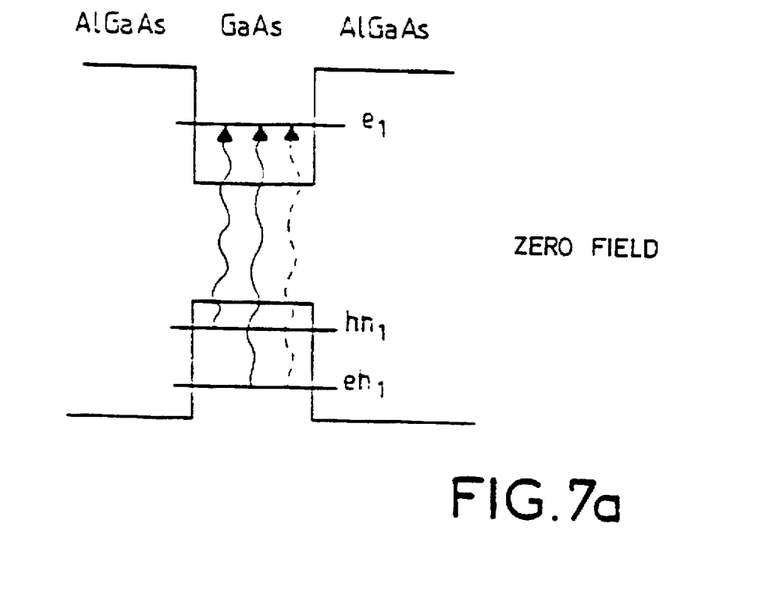
FIG. 7a pertains to a structure without applied electrical field.
Figure 7B:
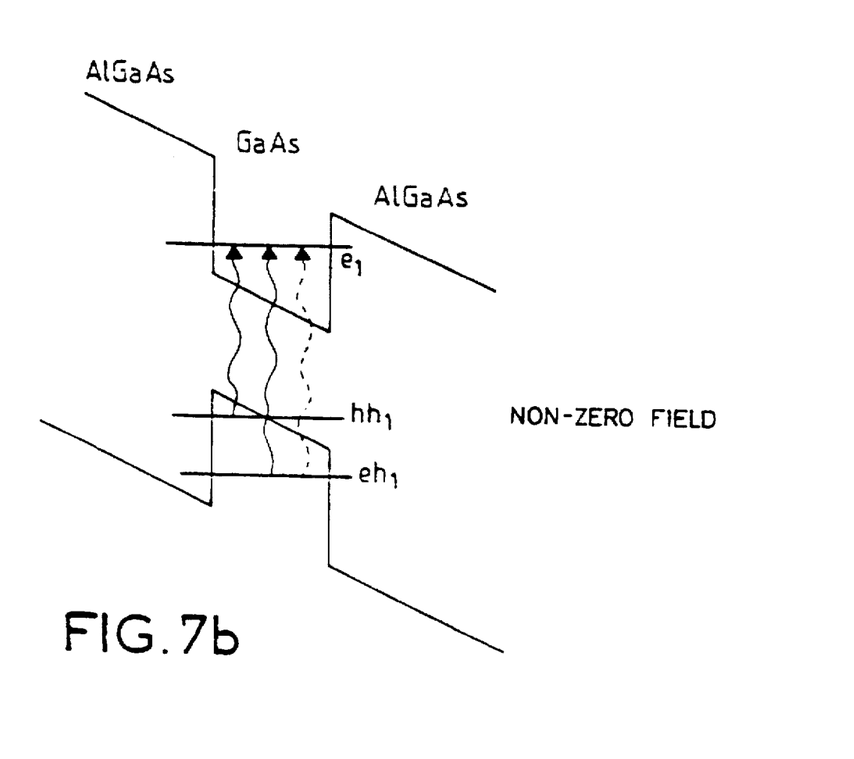
FIG. 7b pertains to a structure under electrical field.
Figure 7C:
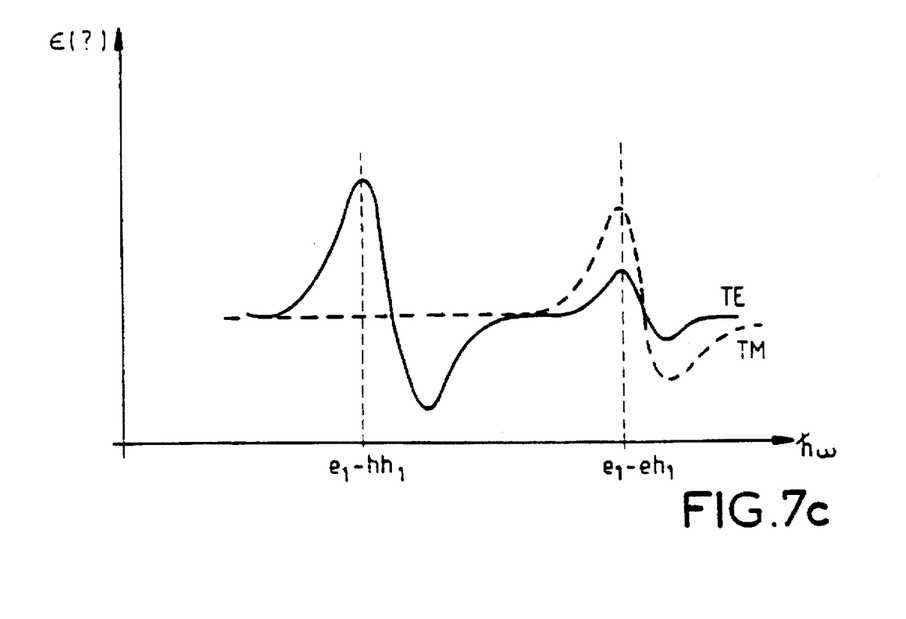
FIG. 7c illustrates the TE and TM indices of the structure as a function of the energy 2 πħω.

The optical transitions for the TM and TE waves are then very different so that the associated optical indices, as explained in the book by Gérald Bastard, *Wave Mechanics Applied To Semiconductor Heterostructures*, Les Editions de Physique. It is then possible to increase the birefringence of the non-linear medium by using quantum structures, as shown in FIG. 7. A typical thickness of layers to obtain quantum well structures is in the range of some tens of Angstroms (50 A). FIG. 7c gives a view, in unbroken lines (and dashes respectively) of possible transitions between the levels $hh_1$ and $e_1$ and between the levels $lh_1$ and $e_1$ for the TE (and TM) modes.

It can thus be seen that for a quantum well structure made out of the pair of materials AlGaAs/GaAs, the transitions in (TE) mode are favored to a greater degree between $e_1$ and $hh_1$ than between $e_1$ and $lh_1$ whereas in the (TM) mode only the transition between $e_1$ and $lh_1$ is possible.

This configuration therefore greatly increases the birefringence.

Figure 8:
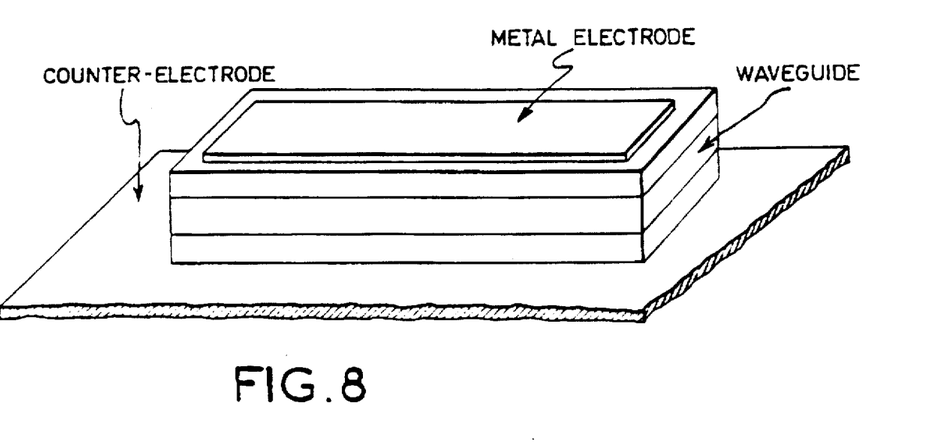
FIG. 8 gives a schematic view of a waveguide-based frequency converter structure that can be controlled by electrical voltage.
Figure 9A:
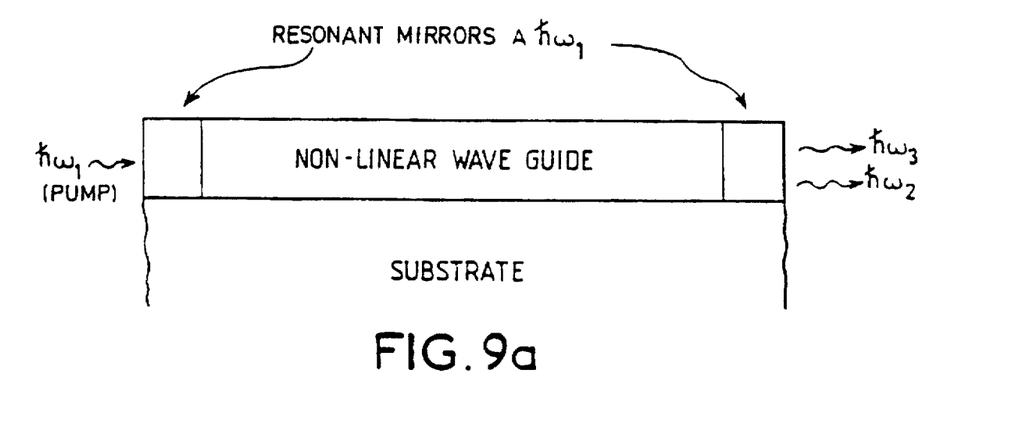
FIGS. 9a and 9b illustrate a frequency converter according to the invention working as an optical parametrical oscillator.
Figure 9B:
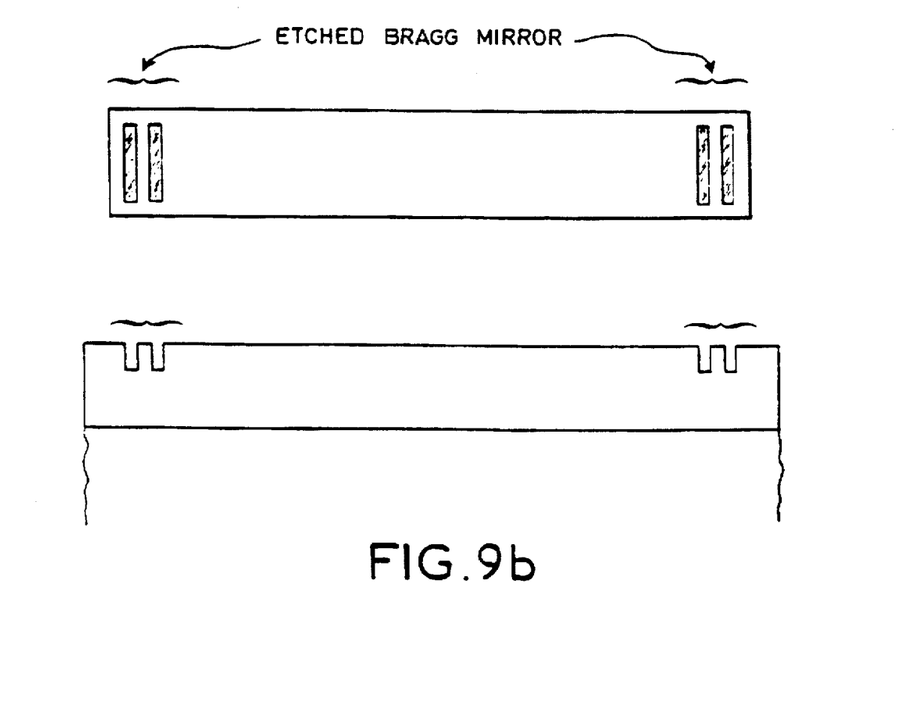

Another value of quantum well structures lies in the extent of the electro-optical effects brought into play. This is the "Confined Stark Effect" especially described in the book by Gérald Bastard. By applying an electrical voltage perpendicularly to the plane of the quantum wells as shown in FIG. 8, it is possible obtain a very great variation of the optical indices of the different optical transitions, hence the wavelengths of the generated waves. The frequency converter according to the invention in this case has a counter electrode and an upper electrode enabling the application of the desired electrical field. This makes it possible to electrically tune the generated infrared wave. Finally, it is also possible to use stressed SC layers such as InP/InGaAs which, it is known, also increase the birefringence.

In the different variants of the invention presented hitherto, the frequency converter was supplied by two pumps at two different wavelengths.

Figure 10A:
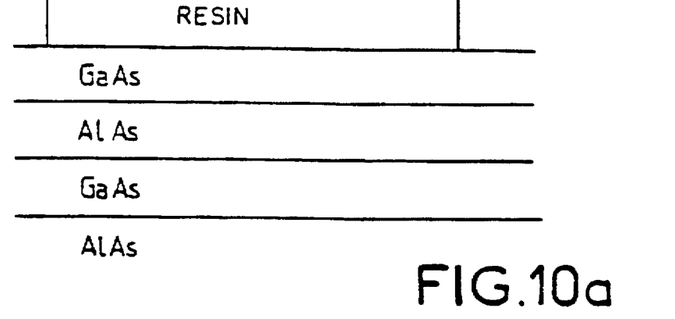
FIGS. 10a–10c illustrate the different steps of a method leading to the making of an alternation of GaAs/AlOx layers.
Figure 10B:
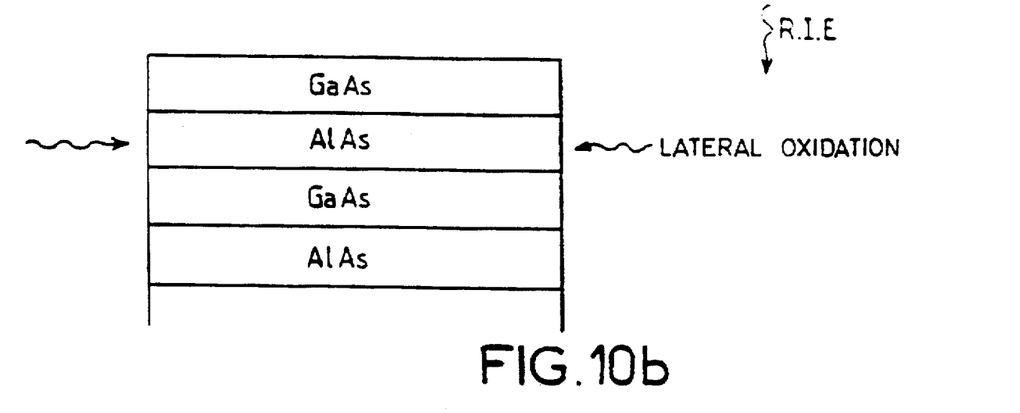
Figure 10C:
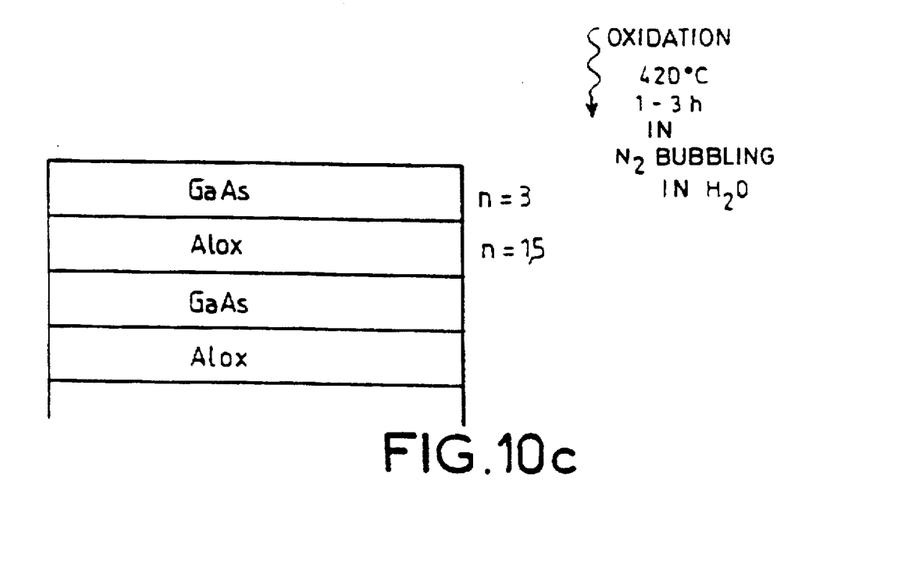

Nevertheless, the frequency converter according to the invention can also work as an optical parametrical oscillator. In this case, only one pump wavelength is used. For this purpose, two mirrors are chosen to very strongly reflect the pump wavelength and transmit the wavelengths generated. FIG. 10 illustrates an exemplary possible configuration for the mirrors made on each side Of the frequency converter used as an optical parametrical oscillator. These mirrors are Bragg mirrors which in particular may be etched up to the surface of the heterostructure semiconductor waveguide.

In this configuration, the frequency converter is capable of generating high power. This makes it particularly valuable in a pulsed operation.

As a rule, the performance characteristics of the frequency converter according to the invention are related to the differences in index between the materials $M_I$ and $M_{II}$. It proves to be the case that the greater this difference, the better are the performance characteristics. Typically, the indices of the materials GaAs and AlAs referred to here above are respectively 3.3 and 2.9.

It has been seen that by oxidizing AlAs, the refraction index drops to a value of 1.5, thereby enabling the efficiency of the frequency converter according to the invention to be increased.

FIG. 10 shows the different steps of the method enabling the oxidizing of the AlAs layers.

For this purpose, resin patterns are deposited on the surface of an alternation of GaAs/AlAs layers in a standard way to define the converter surface. The different layers are etched by reactive ion etching (RIE).

The unit is placed in a furnace through which there flows a carrier gas ($N_2$ for example) saturated by water vapor (with oxidation for some hours at 420° C.). AlAs is thus oxidized into $AlO_x$ with a lower index.

What is claimed is:

1. An electromagnetic wave frequency converter capable of generating an electromagnetic wave of frequency $\omega_3$, comprising a heterostructure semiconductor waveguide formed by alternating layers of materials $M_I$ and $M_{II}$;

wherein:
    at least one of said materials is a non-linear semiconductor;
    a plane of each of said alternating layers is parallel to a direction of propagation of electromagnetic waves in the waveguide;
    said waveguide is supplied with two electromagnetic pump waves with frequencies $\omega_1$ and $\omega_2$ having a difference in frequency equivalent to $\omega_3$; and
    said electromagnetic pump waves with frequencies $\omega_1$, $\omega_2$ achieve matched phases based on propagation modes (TE) and (TM) that are different between the pump waves.

2. The electromagnetic wave frequency converter according to claim 1, wherein the generated electromagnetic wave of frequency $\omega_3$ also has propagation modes (TE) and (TM) different from either of the pump waves.

3. The electromagnetic wave frequency converter according to claim 1, wherein one of said electromagnetic pump waves is of a propagation mode (TE) is oriented at 45 degrees to a main axis of the semiconductor waveguide.

4. A frequency converter according to claim 1, comprising electrical means that can be used to apply an electrical field perpendicularly to the plane of the layers constituting the waveguide so as to bring about a variation in the wavelengths generated.

5. The frequency converter according to claim 1, comprising a dual core structure in which the heterostructure waveguide is inserted into another guide constituted by a semiconductor medium ($SC_3$), itself inserted into a semiconductor medium ($SC_4$).

6. The frequency converter according to claim 1, wherein the pair of materials $M_I/M_{II}$ is of the type comprising semiconductor materials such as one of GaAs/AlAs, Si/SiGe, and ZnTe/ZnSe.

7. The frequency converter according to claim 1, wherein the wavelength of the pump waves is between 1.07 and 1.42 µm, the wavelength of the generated electromagnetic wave is between 8–12 µm, the thickness of the layers being equal and on an order of 100 Angstroms.

8. The frequency converter according to claim 1, wherein the waveguide possesses a quantum structure constituted by a stack of layers with a thickness of 50 Angstroms.

9. A frequency converter according to claim 1, wherein the material $M_I$ is GaAs, the material $M_{II}$ being an AlOx type of insulator material that is a product of oxidation of AlAs.

* * * * *